United States Patent [19]
Studley
[11] Patent Number: 4,921,747
[45] Date of Patent: May 1, 1990

[54] STAMP HINGE

[76] Inventor: Benjamin A. Studley, 460 Ridge St., Lewiston, N.Y. 14092

[21] Appl. No.: 202,511

[22] Filed: Jun. 6, 1988

[51] Int. Cl.[5] .......................... B32B 7/06; B32B 7/10; B32B 7/14

[52] U.S. Cl. ...................................... 428/195; 428/343

[58] Field of Search ................................ 428/145, 343

[56] References Cited

U.S. PATENT DOCUMENTS

| | | | |
|---|---|---|---|
| 732,889 | 5/1903 | Paver | 428/343 |
| 2,510,120 | 6/1950 | Leander | 428/343 |
| 2,721,810 | 10/1955 | Schrom | 428/195 |
| 3,125,460 | 3/1964 | Rose | 428/343 |
| 3,138,476 | 6/1964 | Phipps | 428/343 |
| 3,515,270 | 6/1970 | Tonn et al. | 428/343 |
| 3,709,763 | 1/1973 | O'Neil | 428/343 |
| 4,460,634 | 7/1984 | Hasegawa | 428/195 |
| 4,486,902 | 12/1984 | Sakai | 428/195 |
| 4,587,152 | 5/1986 | Gleichenhagen et al. | 428/343 |
| 4,741,947 | 5/1988 | Pataki | 428/343 |

*Primary Examiner*—George F. Lesmes
*Assistant Examiner*—J. Davis
*Attorney, Agent, or Firm*—Donald C. Studley

[57] ABSTRACT

The present invention relates to improved stamp hinges that may easily and quickly attached and detached from the back of a postage stamp, either used or mint, without leaving an adhesive residue on either the stamp or on the substrate on which the stamp is mounted. The hinges are pressure-sensitive and adhere by finger or slight contact pressure. The contact, surface of the hinge is partially coated with a water-insoluble, low-tack adhesive. The contact surface has a non-coated area preferably extending along at least the entire length of one edge or one end thereof. The non-coated area comprises from about 5 to about 95 percent of the area of the contact surface.

9 Claims, 1 Drawing Sheet

STAMP HINGE

BACKGROUND OF THE INVENTION

The present invention relates to an improved means of removeably attaching postage stamps to backings, such as, sheets of paper or plastic. More particularly, the present invention relates to an improved stamp hinge that may easily and quickly be peeled from the back of a postage stamp, either in used or mint condition, without damaging the stamp by tearing and without leaving a adhesive residue, or deposit, stain, or other mark on the stamp. The present hinge is also easily and quickly removed from stamp album pages or display sheets without damage to, or leaving adhesive residue, stain, or other mark on the pages or display sheets.

For years postage stamp collectors have utilized stamp hinges to attach postage stamps to album or display pages. Typical present day stamp hinges are fabricated from glassine paper having a coating on the contact side of the hinge of water-soluble adhesive. Stamp hinges generally range in size from about $\frac{1}{4}$ to about $\frac{1}{2}$ inch in width and from about $\frac{1}{2}$ to about $\frac{3}{4}$ inch in length. Typically the water-soluble adhesive layer is comprised of mixtures of materials such as starch and the vegetable gums, dextrins, and water-soluble gums such as, gum arabic, ghatti, tragacanth, Indian gum and the like. In use the collector, or displayer, dampens the adhesive layer and attaches a portion of the hinge to the back portion, usually the top back portion, of the postage stamp to be mounted. The remainder of the hinge is then bent downward, if not already precreased, and attached to the album page.

The adhesive, or gum, utilized on the backs of postage stamps is also a water-soluble adhesive and is typically comprised of materials similar to that used on hinges. When a hinge is attached to the gum on a mint postage stamp, a mixture of the two water-soluble adhesives occurs. As a result, after drying, the hinge frequently can be removed only with difficulty and risk of damage to the stamp. After removal the gum on the stamp remains disturbed. The value to a stamp collector for "never hinged" mint stamps is substantially higher than for mint stamps showing a hinge mark or stain.

BRIEF DESCRIPTION OF THE INVENTION

The present hinges are pressure-sensitive, that is, the adhesive is permanently tacky at room temperature, and the hinges may be made to adhere to the surfaces to which they are applied by mere contact without the need of more than finger, or slight contact, pressure. The present stamp hinges are manually peelable. The adhesive layer consists of a holding adhesive that leaves no noticeable residue on the adherend surfaces, either the postage stamp or the album or display page, after the hinge has been removed. The present hinges are non-staining and non-damaging to the postage stamp. The present hinges may be manually removed, even from mint stamps, without leaving a detectable hinge mark or causing damage to, or disturbance of, the gum layer on the stamp. The adhesive layer utilized on the present hinges is water-insoluble and does not chemically react with either the postage stamp or the substrate to which the stamp is to be attached.

DETAILED DESCRIPTION OF THE INVENTION

The adhesive materials useful on the present stamp hinges are suitably selected from those commercially available on the market. The useful adhesives are selected to have little or no adhesive build-up, i.e., there is substantially no increase in the peel adhesion value after the hinge has been allowed to dwell on the applied surface over an extended period of time. The useful adhesives leave no detectable adhesive deposit, that is, when the hinge is detached from a surface, no discernable adhesive material material is pulled away from the hinge surface and remains adhered to the surface to which the hinge was applied. The useful adhesives have little or no cold flow, i.e., they have substantially no tendancy to act like a heavy viscous liquid over long periods of time, which otherwise may result in detrimental oozing, migration, and frequently increases in ultimate adhesion. The useful adhesives leave little or no latent stain, that is, stains which do not become noticeable until sometime after removal, usually after the contact surface has been later exposed to sunlight or heat.

The present adhesives are low tack and the hinges have a peel adhesion ranging between about 0.5 and about 3.0 oz./in., and more preferably between about 1.0 and about 1.5 oz./in. Peel adhesion is the force per unit width, expressed in oz./in. that is required to break the bond between the hinge and the surface to which it is applied when the hinge is peeled back at an angle of 180 degrees. Suitable adhesives are those marketed by Minnesota Mining Co. (3M) and utilized on products nos. 653, 654, 655, and 682.

The flexible backing utilized in the present hinges may suitably be paper, for example, glassine, or a high grade nonsulphate paper, or an inert, non-bleeding, plastic film, for example, mylar.

The adhesive material is suitably spread, or layered, on the backing material by any of the methods well known in the art, for example, by knife, roller, coating, or calendering. Typically after the adhesive layer is spread, it is partially dried to produce a pressure-sensitive film, or layer, of the desired thickness and low tack. The hinges are subsequently cut from larger coated sheets by methods which are also well known in the paper art, for example, those methods used in the fabrication of paper tablets and pads.

Although the adhesive layer may suitably cover the entire contact surface of the present stamp hinge, it is preferred that a non-coated, or ungummed, area extend along at least one edge of the hinge to facilitate separation of the hinges one from the other by the user and to enable the present hinges to be manufactured, packaged and stored in a layered arrangement. That is in layered stacks, or blocks. The non-coated edge area permits the user to easily separate and remove the topmost hinge from the stack without disturbing the remainder of the hinges which comprise the stack. The non-gummed area preferably extends along the edge of at least one entire length or one entire width of the hinge. In a further useful embodiment the hinge has a non-gummed area extending across the middle of the hinge to facilitate ease of folding the hinge during the stamp mounting operation. In a further embodiment the adhesive coating on the present hinges is discontinuous, that is, the adhesive surface is comprised of spots, or areas, that are uncoated and spots and areas that are coated.

The attached drawings illustrate several preferred embodiments of the present invention, including the use of various types of useful adhesive arrangements aptly suited to use in the present invention. Like numbers designate like components in each of the separate views.

Figure 3:
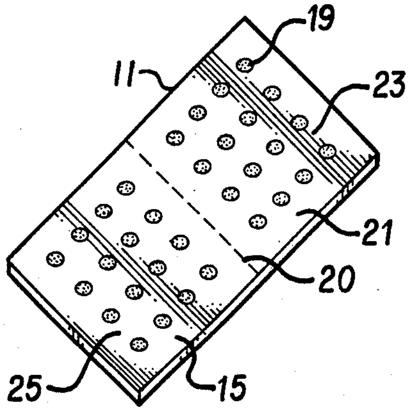
Figure 4:
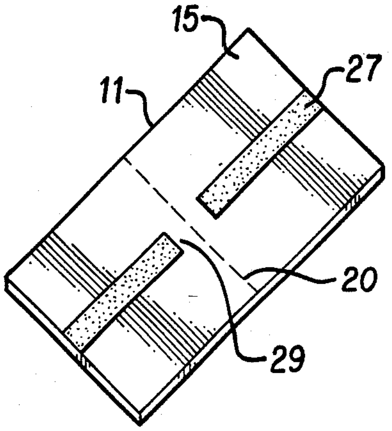
Figure 5:
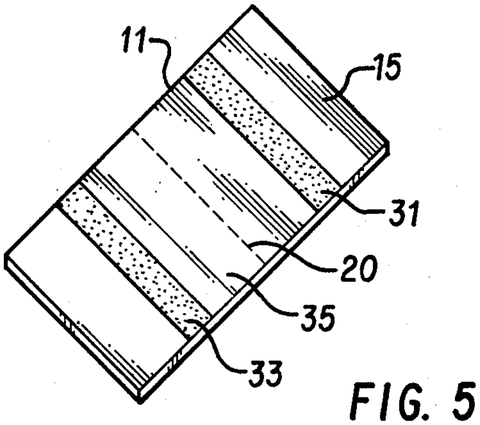

FIGS. 3, 4, and 5 are prespective views of hinges illustrating various adhesive layer configurations.

Figure 1:
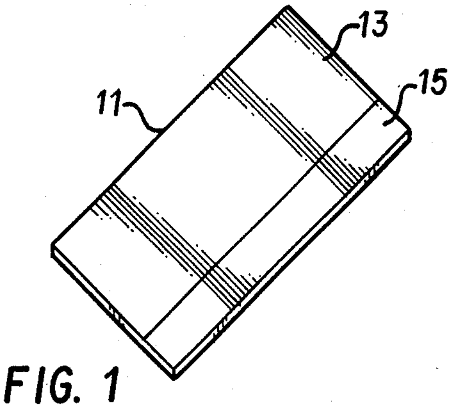
FIG. 1 is a perspective view illustrating a hinge of the present invention having a non-coated area along one edge.
Figure 2:
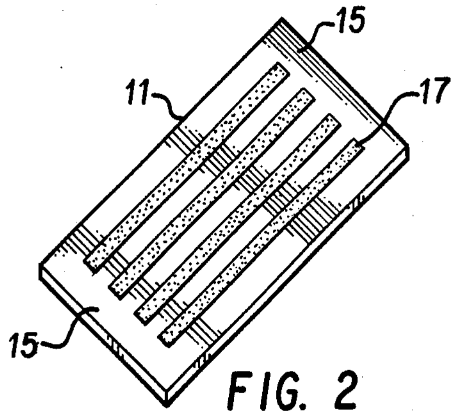
FIG. 2 is also a perspective view of a hinge of the present invention illustrating a discontinuous adhesive area.

Looking now at FIG. 1, a stamp hinge, generally designated as 11, typically fabricated of a flexible backing material of a thin sheet of paper or plastic, has low tack, water-insoluble adhesive coating, or layer, 13 on the contact surface thereof. Hinge 11 has a non-coated, or area without adhesive, 15 extending the length of one side thereof. As shown, the non-coated area extends along only one edge, or side of the contact surface of the hinge, however, it will be understood, and illustrated in the additional drawings, that the non-coated area may extend along more than one side, and may extend around the entire periphery of the hinge. The total non-coated area comprises from about 5 to about 95 percent, and more preferably from about 10 to about 35 percent, of the total contact area of the hinge surface. FIG. 2 illustrates a discontinuous adhesive coating layer, 15. As shown the adhesive layer is comprised of strips of adhesive, such as 17. Strips 17 may be arranged parallel to the length, or the width, or angled across the hinge contact surface. FIG. 2 also illustrates a hinge having non-coated edges, 15, along both the length and the width of the hinge.

FIG. 3 illustrates a hinge having a discontinuous adhesive layer comprised of separate smaller areas of adhesive, such as, 19. As shown the smaller areas of adhesive are in the form of dots, however, it will be understood that the areas may be in the form of circles, crosses, combinations thereof or in a random arrangement. FIG. 3 also illustrates a hinge wherein a non-coated area, 21, extends across the center of the hinge to facilitate folding of the hinge and to insure that there is nq exposed adhesive area along the point of the fold when the hinge is used. For example, portion 23 may be attached to the back of a postage stamp and portion 25 attached to the album page or display sheet, the lateral line of the fold, normally through the center portion of the hinge, for example, through dashed line 20, would not leave exposed adhesive after the hinge is folded.

FIG. 4 illustrated an embodiment in which the amount of adhesive is minimal. Hinge 11 has at least one, and in a preferred embodiment, only one, longitudinal strip, or line, of adhesive, 27, substantially centered on the contact surface. In the embodiment shown, strip 27 has a non-coated, or open, area, 29, along the middle portion of the hinge to facilitate folding along fold line 20 and mounting as described in the foregoing.

FIG. 5 also illustrates an embodiment in which the adhesive coating is minimal and is in the form of a lateral strips. In such embodiment hinge 11 has at least two lateral, and in a preferred case, only two, strips, or lines, of adhesive, such as, 31 and 33, positioned in opposite halves of the hinge surface to provide an uncoated area, 35, in the center portion of the hinge to facilitate folding and mounting as described above.

From the foregoing description, it will be readily appreciated by those skilled in the art that modifications may be made within the present invention without departing from the concepts disclosed. Such modifications shall be deemed to fall within the spirit of the invention as determined by the scope of the appended claims.

What is claimed is:

1. An improved postage stamp hinge comprised of a flexible paper or plastic backing material having a width ranging from about ¼ to about ½ inch and a length ranging from about ½ to about ¾ inch, said backing material having a pressure-sensitive, low tack, water-insoluble adhesive coating on a contact surface thereof, said backing material having a non-coated area extending along at least one edge thereof, said non-coated area comprising from about 5 to about 95 percent of said contact surface, said hinge being manually removable from a gum layer of a postage stamp without damaging or leaving a noticeable residue thereon, and having a peel adhesion between about 0.5 and 3.0 ounces/inch.

2. The stamp hinge of claim 1 wherein the non-coated area comprises from about 10 to about 35 percent of the contact surface.

3. The stamp hinge of claim 1 wherein the said adhesive coating is discontinuous.

4. The stamp hinge of claim 1 wherein the said adhesive coating is in the form of strips.

5. The stamp hinge of claim 4 wherein the strips are longitudinal.

6. The stamp hinge of claim 1 wherein the adhesive coating is in the form of a single longitudinal strip substantially centered on said contact surface.

7. The stamp hinge of claim 6 wherein said strip is separated by a non-coated area along the middle portion of said strip.

8. The stamp hinge of claim 4 wherein the strips are lateral.

9. The stamp hinge of claim 8 wherein the center portion of the contact surface is a non-coated area.

* * * * *